No. 713,246. Patented Nov. 11, 1902.
G. B. SHEPARD.
MATRIX MAKING MACHINE.
(Application filed Nov. 26, 1892.)
(No Model.) 7 Sheets—Sheet 3.
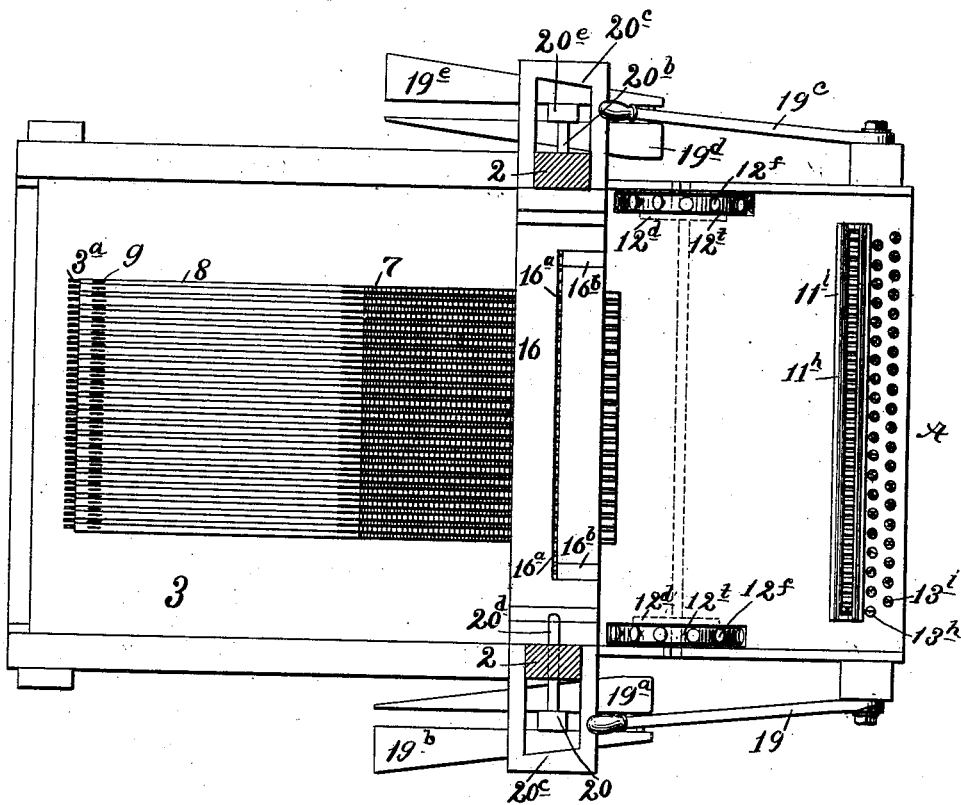
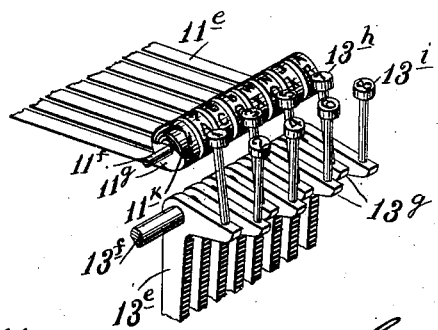
Witnesses
Walter E. Allen.
Edward D. Knight.
Inventor
Geo. B. Shepard
By Octavius Knight
Atty No. 713,246. Patented Nov. 11, 1902.
G. B. SHEPARD.
MATRIX MAKING MACHINE.
(Application filed Nov. 26, 1892.)
(No Model.) 7 Sheets—Sheet 4.
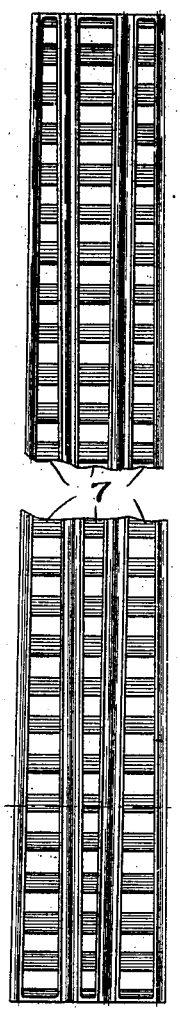
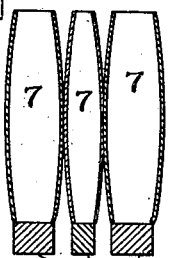
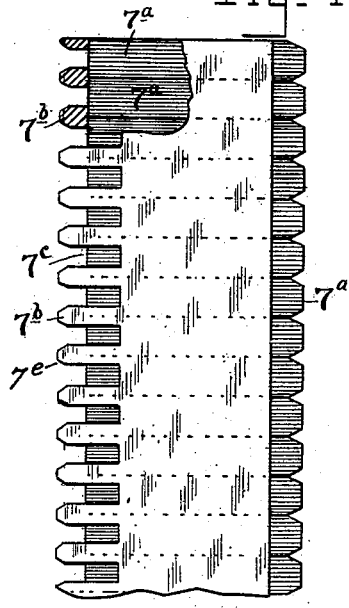
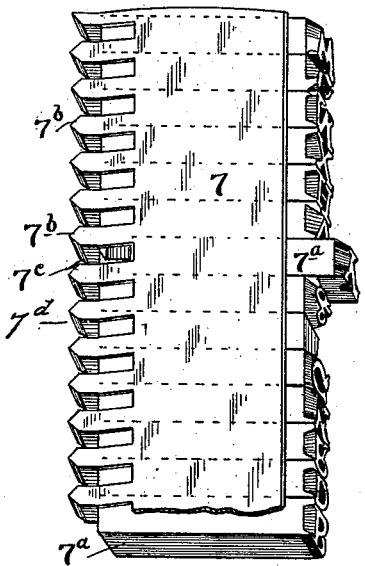
Witnesses
Walter E. Allen
Edward D. Knight
Inventor
Geo. B. Shepard
By Octavius Knight
Atty No. 713,246. Patented Nov. 11, 1902.
G. B. SHEPARD.
MATRIX MAKING MACHINE.
(Application filed Nov. 26, 1892.)
(No Model.) 7 Sheets—Sheet 5.
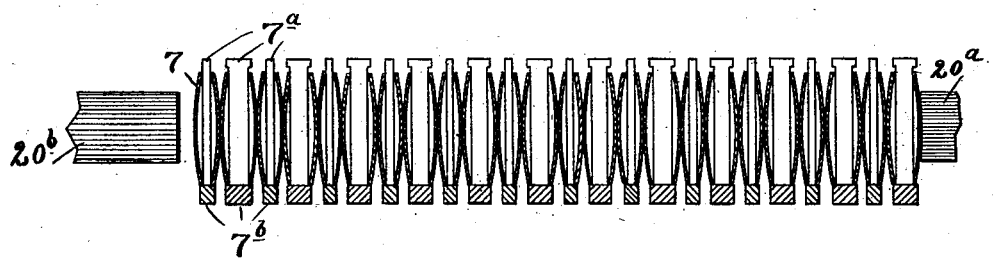
Fig. XI.
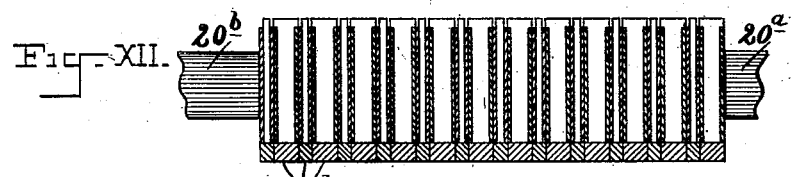
Fig. XII.
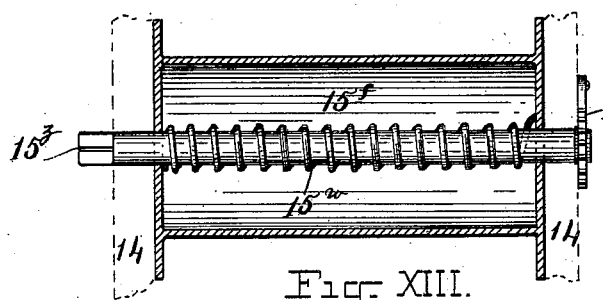
Fig. XIII.
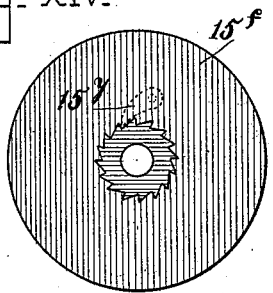
Fig. XIV.
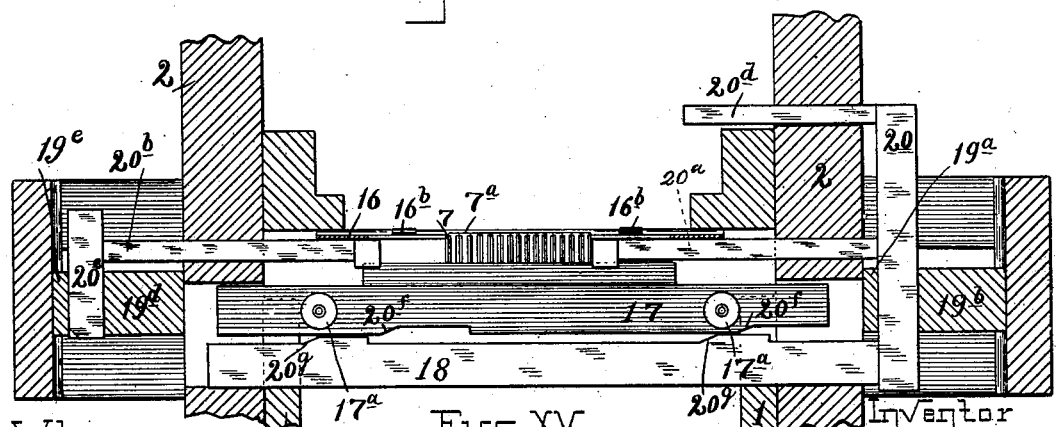
Fig. XV.
Witnesses
Walter E. Allen
Edward D. Knight
Inventor
Geo. B. Shepard
By Octavius Knight
Atty

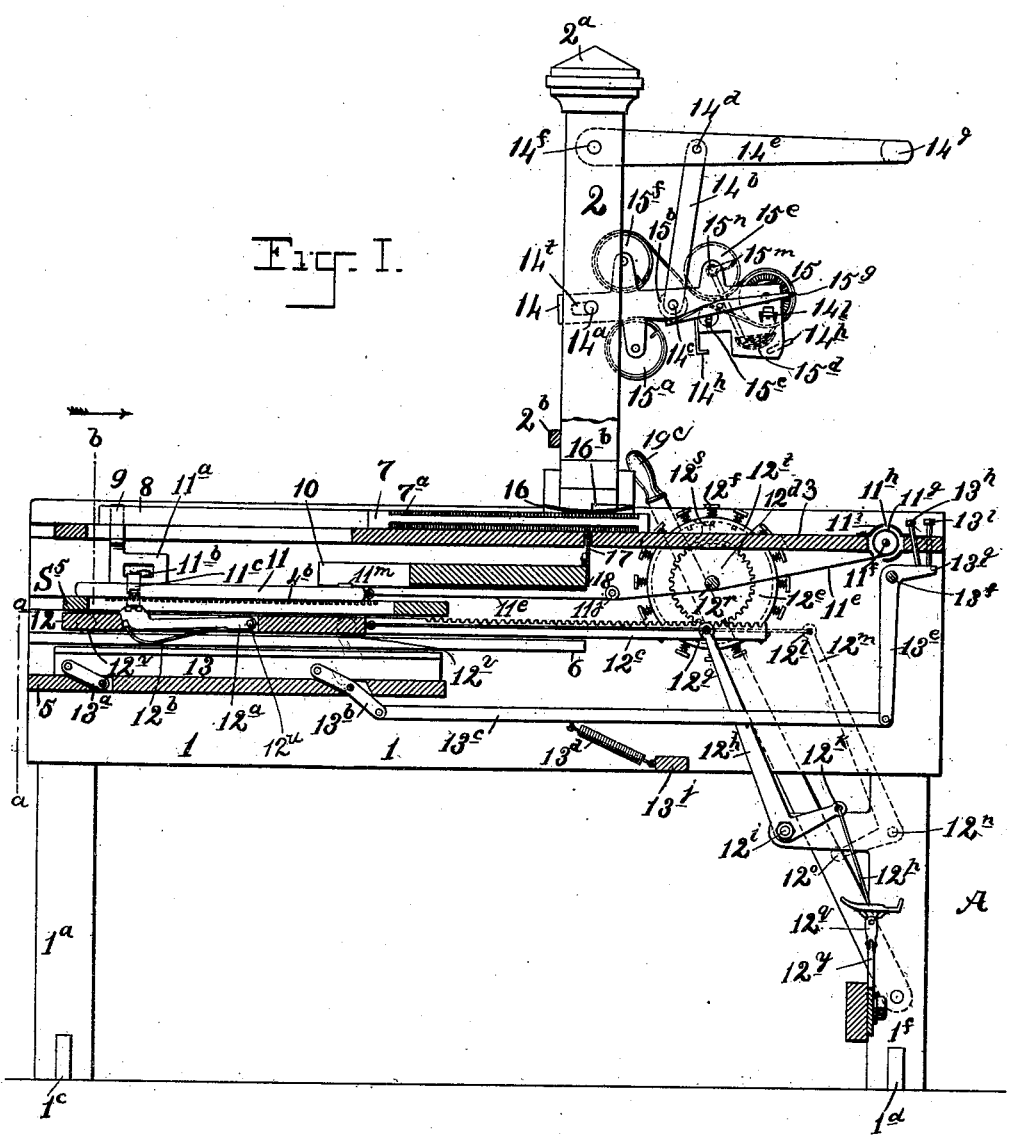

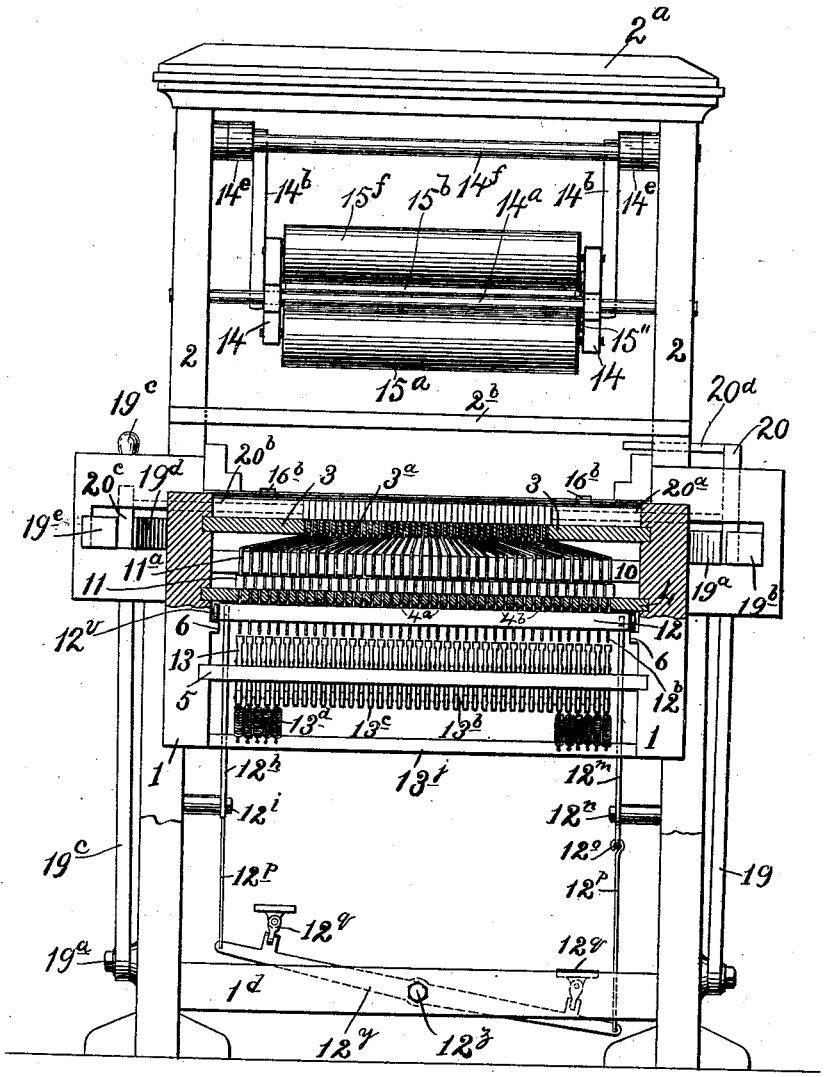

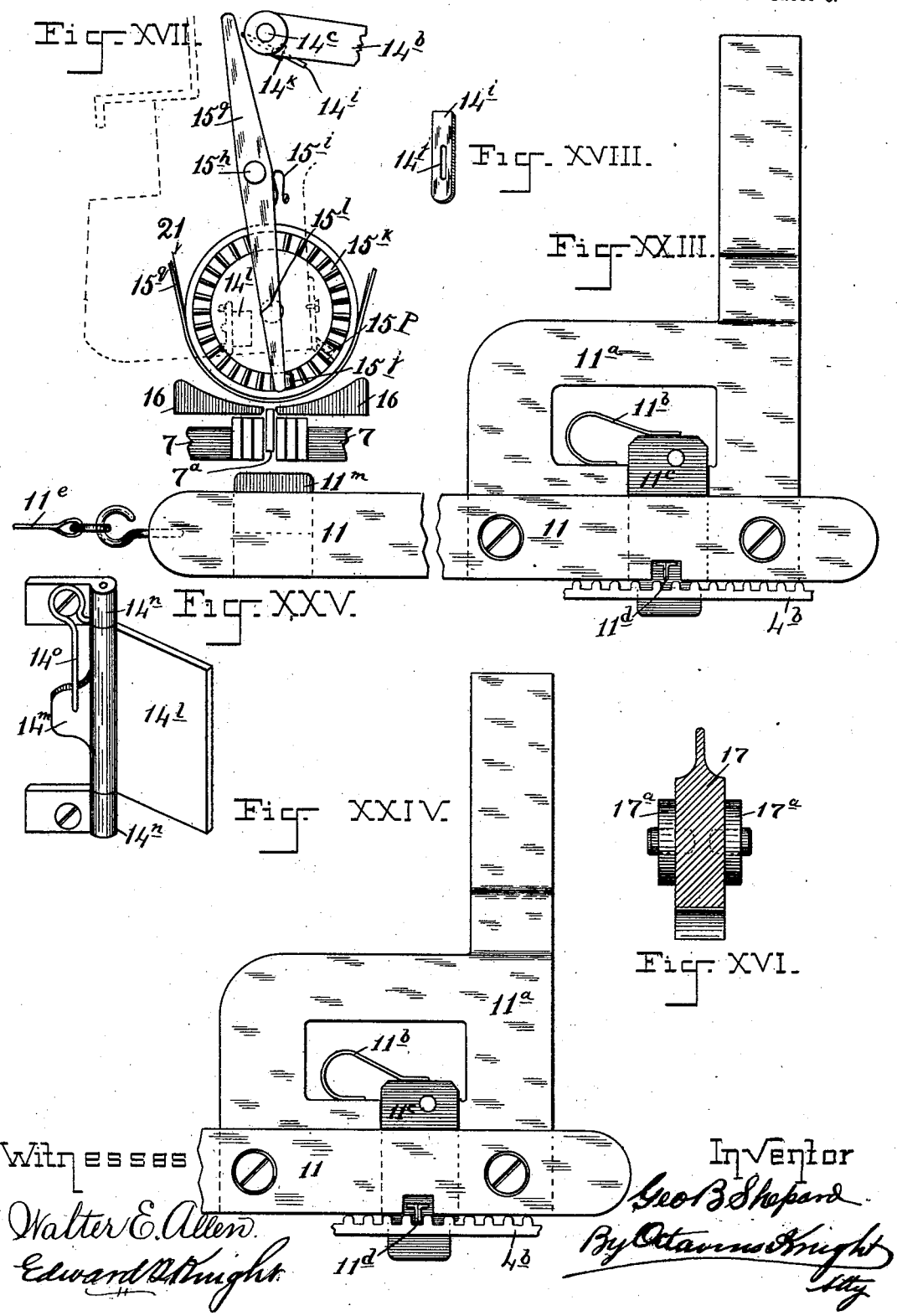

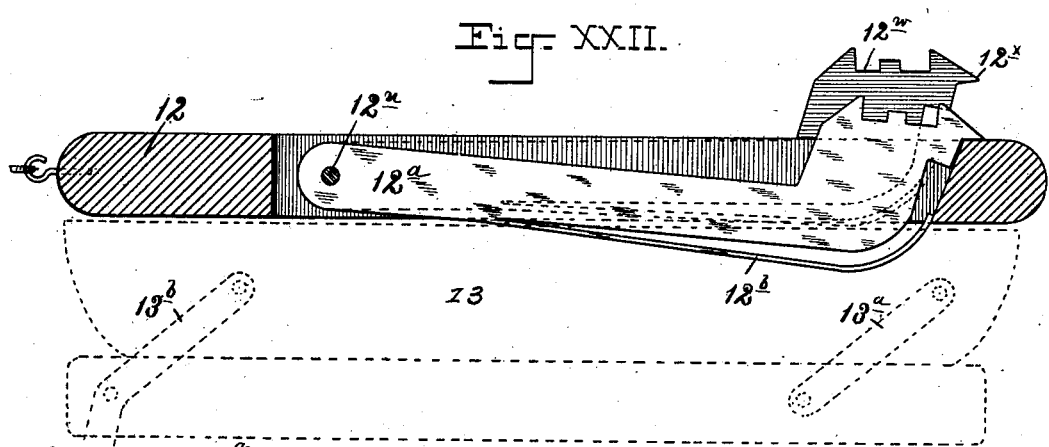

UNITED STATES PATENT OFFICE.

GEORGE B. SHEPARD, OF OGDENSBURG, NEW YORK.

MATRIX-MAKING MACHINE.

SPECIFICATION forming part of Letters Patent No. 713,246, dated November 11, 1902.

Application filed November 26, 1892. Serial No. 453,253. (No model.)

*To all whom it may concern:*

Be it known that I, GEORGE B. SHEPARD, a citizen of the United States of America, residing at Ogdensburg, in the county of St.
Lawrence and State of New York, have invented a new and useful Matrix-Making Machine, of which the following is a specification.

My invention relates to that class of matrix-producing machines in which the type may be individually selected and spaced, adjusted to the width of the column or page, and simultaneously impressed transversely upon the matrix material and automatically advanced after each such impression the required distance from the line impressed to that next succeeding, so that each impression gives a matrix of the entire number of characters so selected in the last line set, and so on until the desired matter is completed.

The object of my invention is to save time and expense in the production of matrices for the purposes above mentioned over any of the processes or machine now employed for such purpose by simplifying the machinery used therefor and making it capable of being correctly operated by persons of ordinary education, while retaining the advantages of positive motions, interchangeability of parts, positive alinement and depth of impression, automatic spacing adjustment, and clear and easy proof-reading and correction before impression on matrix material. This I effect by the means and in the manner hereinafter explained.

Referring to the accompanying drawings, which form a part of this specification, Figure I is a sectionalized side elevation of my improved matrix-making machine, the operator's position being at the place marked A and facing that end of the machine. Fig. II is an end elevation of the same looking from the rear or end opposite that occupied by the operator, as shown by the broken line $a$ $a$, Fig. I, with the upper and secondary platforms sectionalized at the point shown by the broken line $b$, the rear supports of framework broken away, and a portion of the spiral springs $13^d$ removed for clearer illustration. Fig. III is a plan view of my said machine with the upper standards 2 and mechanism carried thereby removed, the better to show the type-bars and type and line-adjusting devices. Fig. IV is a diagram representing the relative positions of the index ribbons and reels, the finger-keys, and rightangled levers for actuating the track-bars. Fig. V is a plan of a portion of the typetroughs in series, showing the relative position in which the same are grouped upon my said machine. Fig. VI is a transverse section of the same at the line $c$ $c$ in Fig. V. Fig. VII is a top view showing the relative position of the type within such type-troughs. Fig. VIII is an end view of the type in such relative position. Fig. IX is a side view of a portion of one type-trough with some type in position and a portion of the side broken away, showing position of type therein and solid bottom portions of said trough. Fig. X is a perspective view of the same, showing the bulging side of the trough and one type raised from its normal position therein. Fig. XI is a vertical section which shows a series of said type-troughs in their expanded condition and with types in position. Fig. XII is a like section of the same contracted so as to clamp the rows of type. Fig. XIII is an axial section, and Fig. XIV is an end view, of the receiving-reel. Fig. XV is a transverse section in the plane of the type-lifter, the number of the bars being less and the type-lifter cam bar and shield proportionally shortened for better illustration. Fig. XVI is an end view of the type-lifter detached. Fig. XVII is a side view showing portions of the cylindrical platen, the line-spacing lever, and coacting parts. Fig. XVIII shows the adjustable cam which actuates the line-spacing lever detached. Fig. XIX is a side view showing portions of the cylindrical platen, the endless belt, matrix-ribbon, the moistening device, the drying-cylinder, the type-depresser, the type-lifter, and coacting parts. Fig. XX shows the moistener by front view and the drying-cylinder by axial section. Fig. XXI shows the moistening-font detached with a portion of its front broken away to show the interior construction. Fig. XXII is a side view showing a portion of the carriage with clutch-bar, clutch-spring, and coacting parts. Fig. XXIII is a side view showing a portion of the actuator-bar, the actuator-standard attached thereto, the latch, the latch-spring, the catch, and a portion of the platform-rack in their relative positions when the latch is raised. Fig. XXIV is a side view of same with latch depressed. Fig. XXV represents the stop-catch, which is attached to side of the platen-frame to prevent movement thereof forward until after the type-lifter is depressed, as hereinafter explained.

Whenever the word "front" is used descriptively in this specification, that side nearest the position of operator at A is intended. When the word "rear" is used, that side farthest from such position is intended. The word "forward" means toward the operator and "backward" the reverse; the "left-hand side" the side at left hand of operator as he sits at A, facing the machine, and "right-hand side" the side at his right hand when in that position.

1 represents the side frames of my said improved machine, which are supported by the four legs $1^a$ $1^a$ $1^b$ $1^b$, each pair being fastened near their lower ends by the tie-pieces $1^c$ and $1^d$.

2 represents standards erected upon said side frames and connected at their upper ends by the cap-piece $2^a$, securely fastened to each standard.

3, Fig. I, represents the upper platform, upon which the type-troughs and their included type move longitudinally, said platform being provided near its rear end with a series of parallel vertical slots $3^a$, Fig. II, cut through said platform and corresponding with the number of the type-troughs for the purpose hereinafter explained. It is also provided near the middle of said standards 2 with a transverse slot to allow the passage therethrough of the type-lifter 17, Fig. I, hereinafter described, and near its forward end with apertures for receiving the index-disks $12^e$, the index-ribbon drums $11^g$ and casing, and the finger-keys $13^h$ $13^i$, all hereinafter explained. The outside edges of this platform 3 are secured within a longitudinal rabbet in each of the side frames 1, as clearly shown at Fig. II.

4, Fig. II, is a secondary platform secured to the side frames 1 in a similar manner as the upper platform and provided through nearly its entire length with a series of parallel slots $4^a$, the same in number, but of greater distance apart, than those in the upper platform, as also clearly shown in Fig. II. The upper edges of the series of ribs in the platform 4, lying between and formed by these parallel slots above described, are provided with a series of metal racks $4^b$, Fig. I, with teeth cut transversely therein to engage the catch $11^d$, Fig. XXIV, in the latch $11^c$, for the purposes hereinafter explained.

5, Fig. I, represents a lower platform secured to said side frames in a similar manner as the upper platform and provided with a series of slots near each end to receive the parallel levers $13^a$ and $13^b$, used to raise or lower the track-bars 13, as hereinafter explained.

6, Fig. II, represents track-rails, one secured in a rabbet in each side frame 1 between platforms 4 and 5, one rail being secured to each side frame and extending inwardly therefrom a sufficient distance to support the track-wheels $12^v$ in the carriage 12, Fig. I. These rabbets are all parallel and longitudinal of said side frame 1.

7 represents the type-troughs shown in detail at Figs. V and VI, each trough having an extension 8, Fig. I, near the rear end of which is a mortise 9, Figs. I and III, for receiving the upper end of the standard $11^a$, Fig. XXIII, attached to the actuator-bar 11, for the purposes hereinafter explained. The side walls of the type-troughs are of steel plate or other springy metal made slightly convex, as shown at Figs. V, VI, X, and XI, so as to allow compression thereof laterally, as shown at Fig. XII, for the purpose of justifying the line when set. The bottom of each type-trough is filled with metal $7^b$, as shown at Figs. VI, IX, X, XI, and XII, to limit the drop of the type after the lifter 17, Fig. XIX, is retracted in the manner hereinafter described, and the bottom of said trough has transverse notches $7^c$, as shown at Figs. IX and X, to permit entrance of the upper end of the lifter 17 to raise a line of type for the impression of the matrix material. At Fig. X the type $7^a$, bearing character "Y," is represented in its lifted position within the type-trough 7, clearly showing below said lifted type the hollow trough and solid metal bottom $7^b$ at the side of the notch $7^c$. The lower walls of these notches $7^c$ are chamfered away to either a point, as shown at $7^d$, Fig. X, or partially, as shown at $7^e$, Fig. IX, for the purpose of correcting the alinement of said trough with the others in series when the type-lifter 17 is raised in one of the notches of all the troughs, as hereinafter explained, it being apparent that if such type-trough be slightly out of alinement the upper portion of the said lifter will strike against this chamfered wall of the notch $7^c$ and by its action in rising force such type-trough to one side of its course a sufficient distance to bring said upper portion of said lifter within the notch $7^c$, and consequently the type into alinement. These type-troughs are preferably made tapering from end to end, as shown at Figs. V, VI, and VII, for reception of the different widths of type of the kind in ordinary use for printing. The taper of each trough will be necessarily less and the type will be brought closer together for impression if the body of the wider type be cut away on each side, as shown in Figs. XI and XII; but said cutting away is not to exceed the thickness of the side wall of said type-trough next adjacent thereto. The type $7^a$ are placed upright in the trough, with the notched side of one type next the opposite side of the next type, and so on until filled. The relative positions of the characters on such type may be varied to suit circumstances, while the general principle of placing the narrowest type at the narrowest end of the type-trough and type of gradually-increasing width toward the wider end of such trough is preserved. Said type-troughs 7, with their included type, are placed upon the platform 3, Fig. I, alternately with the wide end of one next the narrow ends of those immediately next to it, bringing the type into the relative arrangement shown at Figs. VII and VIII, and so on throughout the series.

10, Fig. I, represents a guide-board arranged parallel with the platforms 3 and 4 and fastened to and between the side frames 1 and provided with a series of fingers at its rear end of sufficient number and width to receive and guide the actuator-bars 11 by means of the spurs $11^m$ and standard $11^a$, Figs. XXIII, attached to and carried by said actuator-bars, the said fingers being parallel with each other and of a width corresponding to the ribs in platform 4, hereinbefore described, and having a series of parallel grooves on the under side of said guide-board the entire length of its solid portion of the same width as and communicating with the openings in said guide-board between said fingers, so that as the spur $11^m$ on the actuator-bar travels in its forward movement beyond the base of said fingers it enters said groove and is thereby guided in continuation of its course.

11 represents the actuator-bar, its details being more clearly shown at Figs. XXIII and XXIV, and it consists of a straight bar of sufficient height to freely pass between the upper surface of the platform 4, Fig. I, and the under surface of guide-board 10 and of suitable width to freely pass the contiguous bars of its series (there being the same number of actuator-bars in the machine as type-troughs above described) in their longitudinal movement within said machine, as hereinafter explained. Near the rear end of said actuator-bar and mortised upright in the center thereof is attached the standard $11^a$, Fig. XXIII, of sheet metal, comprising the lower rectangular portion embracing the latch $11^c$, also of sheet metal, working freely vertically between the walls of said standard at each edge thereof and between the walls of said mortise in bar 11 on the sides thereof. The lower part of said latch $11^c$ extends beneath said bar 11 a sufficient distance to pass beyond the teeth of the rack $4^b$, Fig. I, and enter the slot in platform 4, so as to engage with the opening in the clutch $12^a$ when raised, as hereinafter explained, the lower corners of said latch being chamfered, so as to ride upon the beveled outer edges of said clutch, and to it is transversely secured a T-shaped catch $11^d$, Fig. XXIV, a slot being cut transversely in said bar 11 of sufficient depth to receive the head of said catch on both sides of said latch, as shown at Fig. XXIII, and the stem of said catch being of proper dimensions to engage with the teeth of the racks $4^b$, above described, and be included within the outer walls of said bar 11. Included within the opening of said rectangular portion of said standard $11^a$ is the strap-spring $11^b$, attached thereto and its free end pressing against the upper part of latch $11^c$, holding it normally depressed and the catch $11^d$ in engagement with the rack $4^b$. The upper portion of said standard $11^a$ is prolonged either straight upward (as would be the case with the central member of the series, as shown at Fig. II) or to one side or the other, according to its position in series with its fellows and to correspond with the difference in lateral position of the slots in platform 4, into which its latch-piece $11^c$ drops, and the corresponding slot in platform 3, through which its upper end is then projected to engage with the mortise 9, Fig. 1, in the rear end of its corresponding type-trough extension 8 for the purpose of imparting motion to the type-trough, as hereinafter explained.

To the forward end of each actuator-bar is attached, by a hook and ring, an index-ribbon $11^e$, Fig. I. These ribbons after passing under a series of grooved loose sheaves $11^j$, hung upon a common stud-shaft, are fastened to and wound upon a series of hollow drums $11^g$, each containing and actuated by a volute spring fastened to the inside circumferential casing of said drum at the outer end and at the inside end attached to a common shaft $11^f$, upon which said drums are sleeved, and which shaft is fastened at each end to the platform 3, the series of said drums being contained within a casing $11^i$ in said platform 3, having a slot for the entrance of said ribbons on the under side and a sight-slot $11^h$ on the upper side, said springs being put under tension sufficient to cause the index-ribbon to wind itself up automatically upon its appropriate drum whenever relieved from the pull of the actuator-bar. The periphery of each of said drums has a square transverse face corresponding in width with the index-ribbon employed, which may be nearly as wide as the actuator-bar 11. Between each consecutive two drums is strung on said common shaft a washer of greater diameter than said drums for the purpose of keeping each of said index-ribbons upon its proper drum. Each index-ribbon is inscribed on its under side with characters in order and distance apart corresponding with the type contained in the type-trough to which said ribbon is attached through its actuator-bar and at such distance from said actuator-bar that the same character shall be exhibited on said ribbon under said sight-slot as is carried on the face of the type contained in the type-trough attached thereto in position immediately under the alining-slot $16^a$ in the shield 16, as hereinafter described.

12, Fig. I, represents a carriage comprising a movable platform having wheels $12^v$ on both side edges thereof running on the track 6, hereinbefore described, and in its middle part a series of clutch-bars $12^a$, hung on a common transverse shaft $12^u$ in parallel vertical slots in said carriage at such distance apart and in such position that the upper portion of each clutch enters the lower portion of its corresponding slot $4^a$ in platform 4, hereinbefore described, and when said clutch is raised and said carriage propelled forward, as hereinafter explained, said clutch will travel freely within said slot $4^a$ to the extent of its motion. The clutch-bar $12^a$, Fig. XXII, consists of a narrow flat bar of sheet metal having an upward extension with projecting lid $12^x$, engaging with the end of carriage beyond its slot, which limits the downward movement of said clutch-bar. A bevel-face at each side of such extension engages (when raised, as hereinafter explained) with the lower corners of the latch $11^c$, Fig. XXIII, above described, and a recess is provided in the upper face of such extension having rectangular walls and of sufficient length and depth to contain the portion of said latch $11^c$ depending below the actuator-bar 11, as above explained. To the forward end and near each side of said carriage 12 is rigidly attached the projecting rack $12^c$, Fig. I, engaging with the pinion-wheel $12^d$, attached to the disk $12^e$, revolving on the shaft $12^r$, attached to said side frames 1. The said disk has an outturned rim $12^t$, carrying the index-keys $12^f$, inscribed on their outer faces with characters in the same order of arrangement as upon the index-ribbon hereinbefore described, each character being represented by a single key. The number of keys shown in Fig. I are much less than that actually employed, so as to show more clearly the construction and arrangement thereof. A disk $12^e$ being similarly connected at each side of the machine, (see Fig. II,) the characters inscribed on the index-keys on the right-hand disk are arranged in the order of the type contained in one set of troughs—as, for instance, with the narrowest-faced letter at the forward end—and those on the left-hand disk are arranged in the order of the other or intermediate set of troughs, as hereinbefore described. Each of these index-keys consists of a stem passing through an aperture in said outturned rim of disk $12^e$ and an enlargement on the innermost end thereof to prevent said key from passing outward through said aperture, an enlarged outer end inscribed upon its outer face with the appropriate character, and a spiral spring encircling said stem between the enlarged outer end and disk-rim, its tension tending to keep said key normally at its greatest outward position. To the inside of the side frame 1 is attached a lug $12^s$, projecting immediately under the uppermost portion of said outturned rim and in such position relative to said index-keys in said rim that when one of said keys is depressed the lower end thereof will be stopped against the side of said lug and in such part of the rotation of said disk as will bring the type in the trough corresponding with the character on such depressed key immediately under the alining-slot $16^a$, as hereinbefore explained. Attached also to the forward end of said carriage 12 by a hinge-joint and just inside of the point of attachment thereto of rack $12^c$, Fig. I, on each side of said carriage are the connecting-rods $12^g$ and $12^l$, which at their forward ends are likewise respectively connected to the longer arm of the bell-crank levers $12^h$ and $12^m$, reciprocating, respectively, on the pin $12^i$ and $12^n$, made fast to the forward legs supporting the side frames 1 1, the shorter arm of such bell-crank levers being respectively connected by connecting-rods $12^p$ to the outer extremities of the foot-treadle $12^y$, Fig. II, vibrating on the pin $12^z$, attached to the cross-bar $1^c$ of the framework of said machine. $12^q$ represents footholds pliably connected to each end of the foot-treadle $12^y$, as shown. Attention is called to the fact that the said bell-crank lever $12^h$, Fig. I, on the right-hand side of said machine is hung with its short arm $12^k$ forward, while the bell-crank lever $12^m$ on the left-hand side of said machine is hung with its short arm $12^o$ extending toward the rear, so that as the carriage 12 is brought forward the arm $12^k$ and the extremity of said vibrating treadle $12^y$, connected thereto, are depressed, while the arm $12^o$ and the other extremity of said vibrating treadle are simultaneously raised, and the operator by pressing either of his feet, placed upon its appropriate foothold $12^q$, downward is able at all times to positively control the direction and limit of motion of said carriage 12 within its track, as herein explained.

13, Fig. I, represents track-bars, T-shaped in cross-section, upon which the respective clutch-bars $12^a$ travel when the corresponding track-bar is raised by means of the parallel levers $13^a$ and $13^b$, pivotally attached to the side of said track-bar at their upper ends and at the lower end of $13^a$ and at the middle of $13^b$ to ribs formed in the platform 5 by a series of vertical longitudinal slots cut in said platform 5. To the lower ends of the levers $13^b$ are pivotally attached a series of connecting-rods $13^c$ at their other ends, hung to a series of right-angled levers $13^e$, which are hung on a common stud-shaft $13^f$, with their upper ends $13^g$ projecting forward in position to receive the thrust from the stems of their respective finger-keys $13^h$ and $13^i$, projected downward through the forward end of the platform 3, as shown at Figs. I, III, and IV. Said finger-keys consist of a straight stem and enlarged head at their upper end and are numbered thereon from left to right hand, the odd-numbered being in the rearward row and the even-numbered in the forward row, such keys being staggered to permit of such arrangement and allow of greater distance apart at the top than between said right-angled levers, and the order of notation and arrangement of said finger-keys correspond with the arrangement of the connected angle-lever, track-bars, clutches, actuator-bars, and type-troughs throughout said machine, so that when only the finger-key numbered "5" is depressed and the carriage 12 is drawn forward only the fifth type-trough of the series is brought forward, with its included type.

It will be further observed that all the type-troughs corresponding with the odd-numbered finger-keys contain the arrangement of type in one direction or with the widest type nearest the operator, and those corresponding with the even-numbered finger-keys contain type arranged in the opposite direction or with the narrowest type nearest the operator. So, also, the arrangement of index-keys on the disk $12^c$ at the left hand will correspond with the arrangement of the type in those troughs actuated through the odd-numbered finger-keys, while those on the right-hand disk $12^e$ will correspond with the arrangement of type actuated through the even-numbered finger-keys. This arrangement readily enables the operator to tell upon which disk $12^e$ will be exhibited the characters corresponding to the type-trough he is then moving to place on said machine and enables him to attain greater speed of operating. It will be further observed that each of said finger-keys is directly forward from its corresponding index-ribbon as exhibited through the sight-slot $11^h$, so that if after the selected line of type in the type-troughs has been set under the alining-slot $16^a$ in the manner hereinafter explained the operator by reading the said line upon the index-ribbons through said sight-slot discovers any error therein the incorrect character in the corresponding trough can be readily removed and the proper character therein brought into position by actuating the said type through its corresponding finger-key without disturbing any of the troughs correctly set.

14, Fig. I, represents the platen-frame, consisting of duplicate side frames with appropriate journal-bearings for supporting the various shafts hung horizontally therein, for the purposes hereinafter explained, said shafts being so journaled as at all times to hold said side frames at a fixed distance apart in the manner usually employed for such purpose. Said platen-frame is hung upon a horizontal rod $14^a$, attached at each end to the standards 2, hereinbefore described, by a transverse slot $14^t$ near the upper ends of said platen-frame, which slots embrace the horizontal rod $14^a$ and allow vertical movement of said platen-frame depending from said rod $14^a$, for the purposes hereinafter explained. Near the center of the platen-frame is hung upon the horizontal shaft $14^c$ the idler $15^b$ for sustaining the endless metal belt, for the purposes hereinafter explained, the shaft $14^c$ being projected through said platen-frame and made fast to the lower ends of the toggle members $14^b$ on both sides of said platen-frame. The upper end of the toggle members $14^b$ are pivotally secured by the bolts $14^d$ to the inside of the upper toggle-levers $14^e$, the upper end of said toggle-levers being hung on the horizontal shaft $14^f$ and secured at each end to the upper part of the standards 2, and the other end of said toggle-levers terminating in a cross-bar, forming the handle $14^g$. By this construction when the handle $14^g$ is swung forward it also raises and swings forward the platen-frame 14, with its included mechanism, and when swung backward until the said toggle members $14^b$ strike against the shaft $14^a$ it carries with it said platen-frame and powerfully depresses the matrix material carried on the platen 15 against the face of the line of selected type, as hereinafter explained, to a fixed limit at each depression, thereby making the impression of said type upon said matrix material invariably to the same distance from the face of said platen, so that when said matrix material is placed upon an even surface and a casting taken therefrom in the usual manner of taking stereotype-castings the type-surface of such casting presents an even face for printing therefrom, which is a very essential feature in matrices for reading-matter. To the rear edge of each side of said platen-frame and about midway thereof is rigidly attached a stout metal hook $14^h$, projecting rearwardly therefrom, with down-turned end and adapted to slide over and engage with the cross-bar $2^b$, attached horizontally to the rear of the standard 2 2, when said platen-frame is depressed, as above described. Through the front lower end of the left-hand toggle member $14^b$, Figs. XVII and XVIII, is formed a mortise extending downward and rearwardly and into which is loosely fitted the cam-plate $14^i$, having a longitudinal slot $14^j$, adapted to receive the stem of the set-screw $14^k$, so that said cam-plate may be projected beyond the lower end of said toggle member $14^b$ and adjustably held in position by the head of the set-screw $14^k$ when said set-screw is driven through said slot $14^j$ into its socket in the substance of $14^b$.

$14^l$, Figs. I and XXV, is a swinging catch hinged to the ears $14^n$, attached to the left-hand side of said platen-frame in position to engage with the projected stop-bar $20^d$, Fig. III, hereinafter described, and adapted to swing shut, pass said projected stop-bar, and swing again open as said platen-frame is swung backward. On the rear of said swinging catch $14^l$ is formed a lug $14^m$, adapted to engage with the spring $14^o$, attached to the upper ear $14^n$, so as to hold the leaf of said catch normally open and limiting its movement outward by engagement against the side of the platen-frame. It will be observed that by this means after the platen-frame 14 has been swung backward sufficiently for the leaf of the swinging catch to pass the projected end of the stop-bar $20^d$ and spring open in rear of said stop-bar said platen-frame cannot be swung forward until the stop-bar $20^d$ is retracted by the outward movement of the post 20, Fig. XV, which simultaneously drops the type-lifter 17, so that the type-depressor $14^p$, Fig. XIX, is not allowed to act upon the type until they are free to fall to their normal position in the troughs 7.

$14^p$ (see Fig. XIX) is the type-depressor, journaled horizontally at $14^r$ within the rear of the platen-frame 14 and held normally at about the angle shown by action of the spring $14^q$, attached at its upper end rigidly to the platen-frame. From each side of said type-depressor at its lower edge is projected a horizontal stud $14^s$, adapted when swung forward to engage with the rear face of the abutment $16^b$, Fig. III, and carry the lower edge of said type-depressor down upon the raised line of selected type and after its axis of vibration is carried forward of said abutment to raise the lower edge of said depressor out of the slot $16^a$ and sustain it above the plate 16 until released from contact therewith and again restored to its normal position by action of the spring $14^q$. When the platen is again swung backward, the studs $14^s$, Fig. XIX, ride on the upper surface of said abutments $16^b$, so that said type-depressor does not drag over the line of selected type.

15, Fig. XVII, represents the platen, journaled horizontally in the platen-frame 14, near its lower end. Said platen has a true cylindrical face of sufficient strength to resist the pressure of the toggle $14^b$ and $14^e$ when exerted against the face of the raised line of type, as hereinafter described. On the left end of said platen and near its outer circumference are cut a series of ratchet-teeth $15^k$, forming a continuous circle and adapted to be engaged and actuated by a ratchet $15^j$ on the lower end of a lever $15^g$, which vibrates on journals $15^h$, attached to frame 14, and is pressed back by the action of spring $15^i$, attached to frame 14. The active stroke of the lever $15^g$ is imparted by contact of the cam-plate $14^i$ when the platen-frame is swung forward.

$15^p$ is a pawl hung to the forward edge of the platen-frame in engagement with said ratchet-teeth $15^k$ on the platen to arrest retrogressive movement thereof.

$15^a$, Fig. I, is a cylinder hung horizontally, as shown, within said platen-frame, and upon it is wound the supply of matrix material. An elastic washer $15''$, Fig. II, of any of the shapes and substances usually employed for such purposes may be interposed between the end of such cylinder and said frame 14 for the purpose of acting as a friction-brake upon the motion of said cylinder.

$15^b$, Fig. I, is an idler or cylindrical pulley hung upon the shaft $14^c$ and free to turn thereon. $15^c$, Fig. I, is a similar pulley hung at each end in bearings $14^m$, Fig. XIX, sliding in transverse grooves in the sides of platen-frame 14, with a spiral spring $14^n$ fastened in the rear of each of said grooves and tending to press the cylinder $15^c$ forward against the endless belt 21. This endless belt is preferably made of aluminium or other non-corrosive metal, and it serves as a traveling support or backing for the matrix material and insures even feed thereof to the impression-cylinder and thence to the drying-cylinder $15^e$.

$15^d$, Figs. XIX and XXI, is a moistening device consisting of a hollow cup hung near its upper end to the platen-frame 14 by the shaft $15^v$, with an oblong rectangular slit in its lower end, through which is passed the wick $15^r$, extending across the surface of the matrix-ribbon $15^q$. A perforated tubular shaft $15^v$ extends across its interior, to which is fastened the flexible tube $15^o$, connected at its other end with the hollow shaft $15^n$. The cup has an aperture in its face fitted with a plug $15^s$, giving access to its interior, and a spring $15^t$, attached at its upper end to said cup and at its lower end bearing against a stud $15^u$, attached to the platen-frame 14, so that its tension will force said wick $15^r$ against the matrix-ribbon.

$15^e$, Fig. XIX, is a hollow drying-cylinder hung upon the hollow shaft $15^n$, fixed in the frame 14, which shaft is attached at one end to a flexible tube $15^x$, Fig. XX, leading from any suitable steam-supply, and at the other end to a flexible tube $15^o$, leading to the moistening device, as heretofore explained. Shaft $15^n$ has a longitudinal orifice along its front communicating with the scoop $15^m$ on the interior of said drying-cylinder rigidly attached to said shaft $15^n$ just below said orifice.

$15^f$, Fig. I, is a receiving-reel, (shown in detail at Figs. XIII and XIV,) whose shaft is journaled horizontally in said platen-frame 14 and is provided with spring $15^w$, ratchet device $15^y$, attached to platen-frame, and winding-arbor $15^z$, so that having been wound up like a clock-spring the recoil of the spring operates to preserve a constant tension on the ribbon of matrix material and to wind up the same on said reel.

$15^q$, Fig. I, represents the ribbon of matrix material, (preferably of a spongy form of cardboard about three-sixteenths of an inch thick, with a facing of thin stereotype paper, such as is in ordinary use for such purpose,) which is first wound upon the supply-reel $15^a$, Figs. I and XIX, and carried thence under the endless belt 21 on the idler-pulley $15^b$, thence in contact with said belt over the tension-pulley $15^c$, past and in contact with the moistening-wick $15^r$, around the platen 15, and against the drying-roll $15^e$, where it leaves said endless belt 21 and is carried to and wound upon the receiving-reel $15^f$ by the means hereinbefore explained.

When matrix material of sufficiently spongy or cellular tissue is used and fine close impressions are to be made thereon, the moistening device and drying-cylinder may be dispensed with and the type impressions made upon the then dry matrix material by the means herein described.

16, Fig. XIX, represents the shield for preventing the type from rising in the type-troughs at any point over the type-lifter, except through the alining-slot 16$^a$, cut vertically through said shield transversely of said machine, its upper surface being concaved to conform with the swing of platen 15 on rod 14$^a$ and the front and rear walls of said slot being made beveling, so as to present the larger opening therein on the under side thereof. This is done for the purpose of drawing any of the type that should be slightly out of line in the type-troughs into alinement as they are lifted through said slot by the action of the type-lifter hereinafter explained.

16$^b$, Fig. III, represents abutments fastened to said type-shield 16, near each end of the alining-slot 16$^a$, with their rear faces nearly vertical at the forward edge of said alining-slot, as indicated by dotted lines in Fig. XIX, and their upper faces extending horizontally to the forward edge of said shield 16 and being placed at such distance apart that their upper and rearward faces come in contact with the sides of the studs 14$^s$ on the depresser 14$^p$, Fig. XIX, hereinbefore described, as the platen-frame is swung forward or backward.

17, Fig. I, represents the type-lifter, which is placed horizontally and athwart said machine vertically below said alining-slot 16$^a$, with each end fitted into vertical guides in the standards 2 2, Fig. XIII, and provided on each side with antifriction-rollers 17$^a$ 17$^a$, bearing against the inner surface of the side frames 1 1 of said machine to facilitate the up-and-down motion of said lifter.

The type-lifter 17 is contracted on its upper edge to adapt it to enter into the transverse slots in the type-troughs, as hereinafter explained, and on its lower edge is provided with oblique surfaces 20$^f$, against which bear similarly-oblique edges 20$^g$ of a reciprocating cam-bar 18.

19 19$^c$, Figs. I, II, and III, are hand-levers pivotally attached at their lower ends to the outside of the forward supports of the machine and near their upper ends, respectively, to the forward ends of the parallel wedges 19$^a$ and 19$^b$ on the left-hand side of said machine and 19$^d$ and 19$^e$ on the other side. The wedges on the outside of each pair are placed with their wide ends rearwardly and those inside with their small ends rearwardly, and the inclined faces of said wedges bear on the outside against the upright beveled bearing-plates 20$^c$ 20$^c$ and on the inside against the outer face of the standards 2 2, and the parallel faces of said wedges slide against the two sides of the uprights 20 and 20$^e$, respectively, so that as said wedges are moved forward said uprights are forced toward the inside of said machine, carrying with them, respectively, the cam-bar 18, Fig. XIII, the line-abutment 20$^a$, and the stop-bar 20$^d$, attached rigidly to the post 20 and sliding in channels cut transversely through one of the standards 2 and the line-compressor 20$^b$, attached to post 20$^e$ and sliding in a similar channel through the opposite standard, the line-abutment 20$^a$ and line-compressor 20$^b$ moving in the same horizontal plane as the type-troughs but at right angles to the motion of said troughs.

The operation of my said machine is as follows: The platen 15 being raised and swung forward with its frame 14 in the position shown at Fig. I, the type-lifter 17 depressed, and the line-abutment 20$^a$ and compressor 20$^b$ retracted, the finger-key 13$^h$ first at the left hand of the operator is depressed by the hand of the operator, thereby raising the track-bar 13, corresponding with said key, by means of the right-angled lever 13$^e$, the connecting-rod 13$^c$, the lever 13$^b$, and the parallel connecting-bar 13$^a$. The carriage 12 is then impelled toward the opposite end of the machine by means of the treadle 12$^q$, connected to said carriage through the medium of the right-angled levers 12$^h$ and 12$^m$, connecting-rods 12$^p$, 12$^c$, and 12$^l$. By these motions of the track-bar and carriage the clutch 12$^a$, held in the slot in said carriage immediately above and corresponding to the raised track-bar, is raised in its position, because of its lower part 12$^b$ riding upon said track-bar. As the carriage is further advanced the upper portion or jaw of this clutch is brought in impact with the lower part of the latch 11$^c$ in the bar 11, contained in the slot 4$^c$ in platform 4, immediately above said clutch. By reason of the inclined upper surface of the outside of the jaw of said clutch striking against a similar incline on the lower surface of said latch further advancement of said carriage first depresses the said clutch (movement thereof being allowed by the spring 12$^b$, attached thereto) until the jaw of said clutch slides under said latch and traveling beyond its bearing against said latch springs up upon its release and forces said latch upward against the action of the spring 11$^b$, carrying with it the catch 11$^d$, fastened transversely in said latch, out of engagement with the rack 4$^b$, so that the actuator-bar 11 is free to move within its bearings longitudinally of said machine. The upper member or standard 11$^a$ of said actuator-bar after passing through its corresponding slot 3$^a$ in the platform 3 is extended upward through the mortise 9 in the rear end of the extension 8 of the type-trough 7, so that its motion is communicated to said type-trough and its included type. At the same time motion is also communicated to the revolving disks 12$^e$ through the rack 12$^c$ and pinion 12$^d$, so that as the desired type in the trough nears its proper position under the alining-slot 16$^a$ the corresponding index-key upon one or the other of said rotating disks comes into sight of the operator above the platform 3 and by depressing such index-key with his free hand brings it to a stop against the abutment 12$^s$, simultaneously stopping in positive position the desired type under said alining-slot through its connected mechanism, as hereinbefore described, thus allowing greater rapidity of movement and quicker and more positive stoppage thereof than if said trough were operated through the treadle alone. The corresponding index-ribbon 11$^e$, being also attached to the forward end of the actuator-bar 11, is moved with the motion of said bar and passing under the pulley 11$^j$ is wound or unwound upon the spring-actuated drum 11$^g$ as said actuator-bar is moved forward or backward, and it is apparent that index-letters being inscribed on said index-ribbon to correspond with the arrangement of the type contained in its connected trough 7 the simultaneous movement of said trough and ribbon, as above explained, will bring the same character on said ribbon under the sight-slot 11$^h$ as is borne by the type in said trough under the alining-slot 16$^a$, so that a perfect index in plain characters of the type under said alining-slot is at all times presented on said index-ribbon to the eye of the operator. When the desired type is thus brought into proper position directly under the alining slot, the finger-key, which during the motions above described has been held depressed by the hand of the operator, is released and the track-bar 13 is lowered by the action of the spiral spring 13$^d$, allowing the clutch 12$^a$ to fall to its normal position in the carriage 12 and the catch 11$^d$ to drop into engagement with the rack 4$^b$, thereby holding the type-trough firmly against further longitudinal movement. In the same manner the desired type in the next succeeding trough is set in position under the alining-slot, and so on through the series of troughs until sufficient characters and spaces have been set to more than fill the desired length of line. The remaining troughs are then set simultaneously, so as to bring a space-quad over the type-lifter by depressing all of their corresponding finger-keys at one time, when the corresponding clutches will rise together and hold the latches and bring the remaining troughs simultaneously into position. The hand-lever 19 on the left side of the machine is then drawn forward to its full extent by the hand of the operator, drawing with it the wedges 19$^a$ and 19$^b$, causing the post 20 to travel laterally toward the center of the machine, carrying with it the incline-bar 18, the line-abutment 20$^a$, and the catch-bar 20$^d$. This movement of the incline-bar 18 through sliding contact with the inclines 20$^f$ on lower surface of the lifter 17 raises said lifter so that the upper portion thereof enters the transverse slots in said type-troughs and under the selected types and raises said types a definite height above their contiguous type, which latter are kept from rising by the fixed shield 16 on each side of the said alining-slot. Further progress of said incline-bar slides the level-bearing surfaces thereof beyond said inclines 20$^f$ and under corresponding level surfaces of said lifter, thereby holding said lifter in a definite fixed position. The type thus selected being thus raised and held above the upper surface of said shield, the operator with his hand pulls forward the right-hand lever 19$^c$, pulling with it the wedges 19$^d$ and 19$^e$ and forcing the post 20$^e$ toward and its connected compressor 20$^b$ toward the abutment 20$^a$, squeezing together the series of type-troughs and straightening the bulging walls thereof until the line of selected types are brought to the width desired. He then grasps the handle 14$^g$ of the toggle-lever 14$^e$ and through its vibrating connecting member 14$^b$ swings the front of the platen-frame 14 downward and backward until stopped by its contact with the cross-bar 2$^b$, the swinging catch 14$^1$, attached to the platen-frame, in the meantime having been tripped by contact with the stop-bar 20$^d$, which has been projected inwardly by movement of lever 19, as hereinbefore explained, further movement backward of the toggle-lever 14$^e$ forces the platen 15, carrying the matrix material, (which has been previously placed thereon in the position heretofore described,) vertically downward upon the line of selected type which has been raised in position last, hereinbefore described. The toggle-lever being now released, said platen-frame is first raised till the hooks 14$^d$ clear the cross-bar 2$^b$ and then swung forward by action of the hand of operator drawing forward and raising said handle 14$^g$. The hooks 14$^d$ on said platen-frame catching over and bearing against the rear of said cross-bar 2$^b$ prevent the swinging of said platen-frame until the matrix material is entirely withdrawn vertically from the face of the type, so that all danger of dragging the matrix material across the type while in contact therewith is positively prevented. As said platen-frame swings forward the lower end of type-depressor 14$^p$ (shown in Fig. XIX) comes into contact with the abutments 16$^b$ (shown also in Fig. III) upon the shield 16 and is forced by further forward movement first downward through the slot 16$^a$ upon the lifted line of selected types, the said type being immediately after the taking of impression and vertical lifting of platen-frame, above described, first released by pushing backward the hand-levers 19 and 19$^c$, allowing said types to drop down into their former position within said type-troughs, and then as said forward motion of platen-frame continues said depressor is dragged over said abutments and when clear therefrom swung back to normal position by spring 14$^q$. (Shown in Fig. XIX.) As the lever 14$^e$ is further lifted and the platen-frame 14 thereby swung forward the adjustable cam 14$^i$ in the end of the toggle member 14$^b$ is brought by the rotation of said member in the journal 14$^c$ in contact with the upper end of the lever 15$^g$, forcing it to vibrate on the pivot 15$^h$ against the action of the spring 15$^i$, carrying with it the ratchet 15$^j$, attached to the lower end of said lever, in engagement with the ratchet-teeth 15$^k$, formed in the end of the platen 15, and causing the platen to revolve upon its journals 15$^l$ the distance of the sweep of the lower end of said lever, carrying with it the endless band 21 and ribbon of matrix material a like distance, unwinding said matrix material from the supply-roller 15$^a$ across the idler 15$^c$, where it meets the endless belt 21 and in contact with the moistening-wick 15$^d$ past the drying-cylinder 15$^e$ and allowing it to wind on the receiving-reel 15$^f$, actuated by the spring contained therein, as heretofore explained. The platen 15 is held against retrograde movement by the pawl 15$^p$. It will be observed that when the platen-frame is swung downward, as above explained, the scoop 15$^m$, attached to and communicating with the hollow shaft 15$^n$ of the drying-cylinder 15$^e$, which shaft is fixed to the platen-frame 14, is brought into contact with whatever water may have condensed from the steam admitted to the drying-cylinder through the flexible tube 15$^x$, heretofore mentioned, and as said platen-frame is again raised the action of said scoop is to gather the water therein and cause it to flow through the hollow shaft 15$^n$ and the flexible tube 15$^o$ into the moistening-font 15$^d$, whence it is fed onto the matrix material through the wick 15$^r$, thereby constantly securing to said font a supply of heated water. Should more water gather in said drying-cylinder than sufficient to keep filled the said moistening-font, it would be returned to the steam-generator through the flexible supply-tube 15$^x$, communicating with the opposite end of said hollow shaft 15$^n$, as hereinbefore explained. The matrix material being thus advanced the proper distance for the succeeding line of impressed matter, the operations above explained are repeated until the desired reading is entirely impressed on such matrix material. Said matrix so impressed is then taken from the machine and arranged in casting box or boxes in the order desired and stereotype taken therefrom in the usual manner or an electrotype taken therefrom in the usual manner of making electrotypes from paper matrices.

Having thus described my invention, the following is what I claim as new therein and desire to secure by Letters Patent:

1. In a machine for forming matrices for stereotyping or electrotyping reading matter, the combination of a series of independently-adjustable type-carrying troughs having notches in their bottoms and normally bulging spring sides, means for retaining the several troughs in their adjusted position by means of their notched bottoms, and means for compressing the series of bars laterally and locking them in their compressed position, substantially as and for the purpose explained.

2. In a matrix-making machine the combination of a series of independently-adjustable type-carriers each bearing a font or complement of separately-movable characters, means for locking said type-carriers in their adjusted positions to bring the required series of characters in line, a pair of bars operating to lift the line of type relatively to the type-carriers and firmly retain it in its elevated position, and a rotary platen depressible relatively to the line of type, the rocking frame in which said platen is journaled and variable means for effecting the automatic rotation of the same in the intervals of impression as set forth.

3. In a matrix-making machine the combination of a series of independently-adjustable type-carriers each bearing a font or complement of separately-movable characters, means for locking said type-carriers in their adjusted positions to bring the required series of characters in line, a pair of bars operating to lift the line of type relatively to the type-carriers and firmly retain it in its elevated position, a rotary platen depressible relatively to the line of type, the rocking frame in which said platen is journaled, the operating-toggle thereof and variable means for effecting the automatic rotation of the platen in the intervals of impression, substantially as set forth.

4. In a matrix-making machine in combination with a swinging platen-frame hung upon a vertically-movable horizontal axis, parallel toggles the upper members of which are prolonged to form an operating-lever, substantially as set forth.

5. In a matrix-making machine the combination with the intermittently-rotated platen 15, a ribbon 15$^q$ of matrix material, the endless band 21 of an inelastic and impervious material, a dampening device 15$^d$, the drying-cylinder 15$^e$ and the tension-roller 15$^c$ whereby the said impervious band 21 is made to move in unison with the matrix material in its passage from the dampening device around the platen and to the drying-cylinder, substantially as and for the purposes explained.

6. In a matrix-making machine the combination of a series of separately-adjustable type-carriers each bearing a font of independently-movable type, means for locking said characters in their adjusted positions to secure the desired series of type in alinement, the vertically-movable bar 17 for lifting the line of type relatively to the carriers, the sliding bar 18 for raising and supporting the lifting-bar 17, the abutment 20$^a$ carried by the bar 18, the clamp-bar 20$^b$ and means for moving said sliding bar 18 and clamp-bar 20$^b$, substantially as and for the purposes set forth.

7. In a matrix-making machine the combination of the levers 19, 19$^c$, reversed wedges 19$^a$, 19$^b$, and 19$^d$, 19$^e$, operated thereby, standards 20, 20$^e$, moved laterally by said wedges and the abutment-bar 20$^a$ and clamp-bar 20$^b$ carried by said standards for compressing and locking the line of type as explained.

8. In a matrix-making machine the combination of a series of separately-adjustable type-carriers each bearing a font of separately-movable type, a series of actuator-bars operated by key attachments, and connections between the said actuator-bars and the type-carriers by which said carriers are moved to bring the required succession of type into alinement, said connections between the actuator-bars and type-carriers being inclined from the sides of the machine toward the center so as to actuate a condensed or contracted series of type-carriers from a key system of greater width by positive movement, as explained.

9. In a matrix-making machine, the combination of the actuator-bars constructed as herein described with a base or body 11 with means for locking the respective bars in the required position and an upper member or standard 11ª said upper members of the bars on either side of the center being inclined inward at an increased angle as the bars approach the sides, in order to condense or contract the field of effort of said actuator-bars while preserving their positive action, as explained in combination with a series of type-carriers, suitable connections between the actuator-bars and type-carriers and mechanism for imparting longitudinal movement to the respective actuator-bars and type-carriers actuated thereby, to bring the required characters into alinement.

10. In a matrix-making machine the combination of an actuator-bar 11 standard 11ª thereof, slotted platform 3 for guiding the same and mortised type-carrier extension 8 for actuating the type-carrier as explained with a type-carrier provided with an alphabet or set of type and suitable mechanism for imparting longitudinal movement to the actuator-bar substantially as explained.

11. In a matrix-making machine, the combination of the carriage 12 actuator-bar 11 and a clutch 12ª in said carriage to engage and move the actuator-bar as described and suitable mechanism for moving the carriage and a type-carrier and a suitable connection for moving it from the actuator-bar substantially as explained.

12. In a matrix-making machine the combination of the actuator-bars 11, carriage 12 clutches 12ª in the carriage for the respective actuator-bars, and rising and falling track-bars 13 controlled by keys and acting on the corresponding clutches 12ª to select or determine the actuator-bar and type-holder to be moved by the carriage as explained together with type-holders carrying sets or alphabets of type and suitable means for moving the carriage 12 as explained.

13. In a matrix-making machine the key-disk 12ᵉ in combination with the type-carriers and type-carrier-actuating mechanism, to accurately determine the movement of the type-carriers as explained.

14. In a matrix-making machine the combination of the carriage 12, and means for moving the same the actuator-bars 11 connected at will with the carriage by suitable clutches, the type-carriers moved by the individual actuator-bars, the rack-bar 12ᶜ, pinion 12ᵈ, disk 12ᵉ and abutting keys 12ᶠ for positively arresting the motion of the actuator-bars and type-holders at the required point as explained.

15. In a matrix-making machine the combination of the actuator-bar 11, spring-latch device 11ᶜ, catch 11ᵈ, locking-rack 4ᵇ and the clutch 12ª for engaging and controlling the latch 11ᶜ with mechanism for moving the actuator-bar and a type-carrier operated thereby, as explained.

16. The combination of the type-carriers, type-carrier actuator-bars 11, the carriage 12 for moving the same and the reversed bell-crank levers 12ⁿ, 12ᵐ, and treadle mechanism for operating the same, substantially as described.

17. The combination of the type-carriers 7, type 7ª therein, slotted shield 16, type-lifter 17 swinging platen-frame 14, platen 15 and type-depressor 14ʳ, substantially as described.

GEORGE B. SHEPARD.

Witnesses:
NATHANIEL WELLS,
DAN S. GIFFIN.